(12) United States Patent
Borchers et al.

(10) Patent No.: US 6,244,654 B1
(45) Date of Patent: Jun. 12, 2001

(54) MOTOR VEHICLE SUNROOF WITH REDUCED BUFFETING NOISE

(75) Inventors: Ingo Borchers, Uhldingen; Ralph Borgwardt, Stuttgart; Boris Braehler, Immenstaad; Stephan Laemmlein, Markdorf, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/367,719

(22) PCT Filed: Feb. 19, 1998

(86) PCT No.: PCT/EP98/00935
§ 371 Date: Nov. 2, 1999
§ 102(e) Date: Nov. 2, 1999

(87) PCT Pub. No.: WO98/36926
PCT Pub. Date: Aug. 27, 1998

(30) Foreign Application Priority Data

Feb. 20, 1997 (DE) .............................................. 197 06 673

(51) Int. Cl.[7] ...................................................... B60J 7/22
(52) U.S. Cl. ................................................................ 296/217
(58) Field of Search ................................... 276/214, 217, 276/216.06–216.09

(56) References Cited

U.S. PATENT DOCUMENTS

| | | | |
|---|---|---|---|
| 2,094,932 | * 10/1937 | Swan | 296/214 X |
| 4,671,564 | * 6/1987 | Sumida et al. | 296/214 |
| 4,676,493 | * 6/1987 | Helbig | 296/216.06 |

FOREIGN PATENT DOCUMENTS

| | | | |
|---|---|---|---|
| 90 07 234 | 10/1990 | (DE) . | |
| 1277910 | * 10/1961 | (FR) | 296/217 |
| 0169322 | * 9/1985 | (JP) | 296/217 |
| 0193715 | * 7/1990 | (JP) | 296/217 |

* cited by examiner

*Primary Examiner*—Dennis H. Pedder
(74) *Attorney, Agent, or Firm*—Evenson, McKeown, Edwards & Lenahan, P.L.L.C.

(57) ABSTRACT

The invention relates to a sliding roof for motor vehicles with reduced sliding roof buffeting noise. It comprises a sliding roof opening, as well as a movable sliding cover (7) for covering the sliding roof opening, whereby, depending on the actual position of the sliding cover (7), a resulting clear sliding roof opening (3) is formed. Pursuant to the invention, the geometry of sliding roofs with an essentially rectangular or trapezoidal, resulting clear sliding roof opening is modified due to the partial or complete covering (5) of at least one of the, as seen in the driving direction, rear corner regions of the resulting clear sliding roof opening (3).

13 Claims, 11 Drawing Sheets

MOTOR VEHICLE SUNROOF WITH REDUCED BUFFETING NOISE

Figure 1:
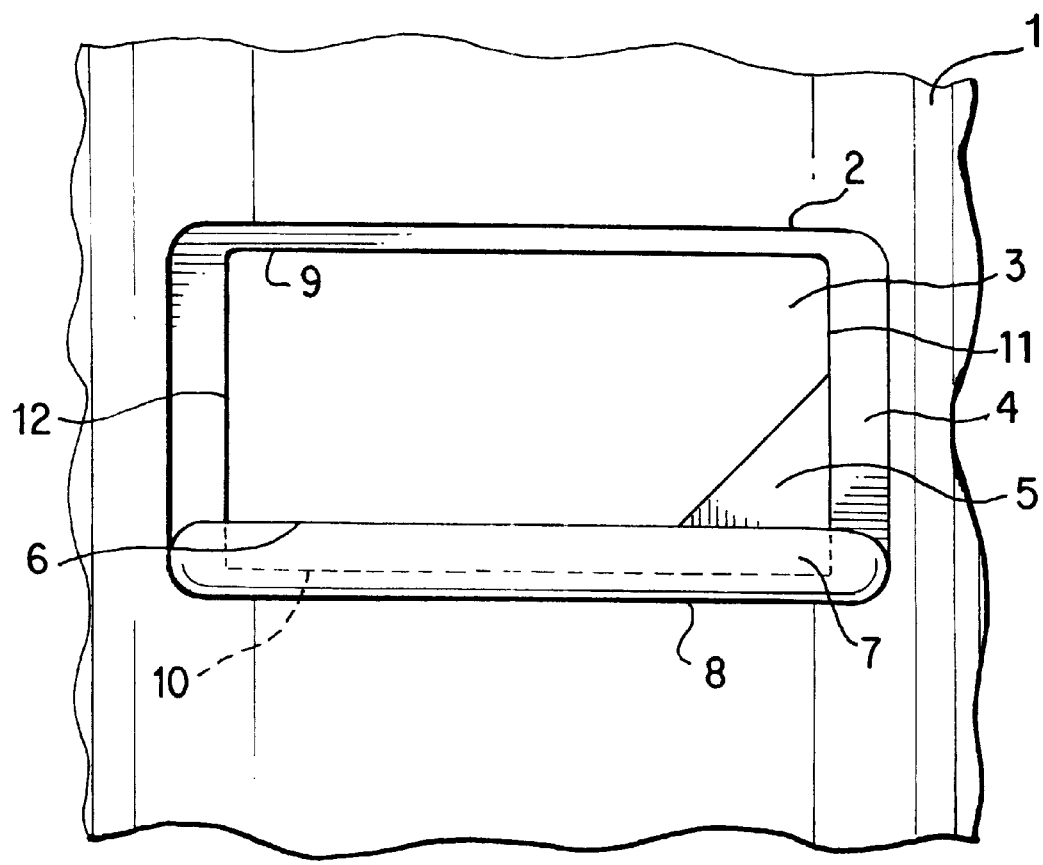

The invention relates to a sliding roof for motor vehicles, with which the resonance noise, the so-called sliding roof buffeting noise, which occurs frequently in motor vehicles with an open sliding roof, can be reduced significantly or even eliminated completely.

In the event that the sliding roof is open, an unpleasant, low frequency resonance of the interior of the vehicle can occur at low speeds of, for example, 50 km/h. This is referred to as sliding roof buffeting noise or simply as buffeting noise and is encountered primarily in the case of large capacity limousines and station wagons. The buffeting noise increases as the size of the sliding roof increases, as it does evermore in modern vehicles.

Some concepts relating to sliding roofs are defined in the following to clarify the rest of the specification. The sliding roof cutout is the cutout in the sliding roof in the outer sheet metal of the roof of the vehicle. The sliding roof opening is the opening to the interior of the vehicle, which is defined by the configuration of the upper boundary of the vehicle interior. A sliding cover, movably mounted, serves to open and close the sliding roof. Depending on the actual position of the sliding cover, the latter covers a portion of the sliding roof opening, so that there is a clear opening to the interior of the vehicle, which is referred to in the following as the resulting clear sliding roof opening. The distance between the, as seen in the driving direction, front edge of the resulting clear sliding roof opening and the rear edge of the latter is the opening length of the resulting clear sliding roof opening.

Physically, the occurrence of the buffeting noise can be explained by the principle of exciter and resonance body. The role of exciter is assumed by the shear layer over the resulting clear sliding roof opening, which arises due to the collision between the air flowing along the outside of the vehicle and the air in the interior of the vehicle. The interior of the motor vehicle assumes the function of the resonance body. When the sliding roof is open, this motor vehicle interior can be regarded as a Helmholtz resonator; that is, the resonance frequency of the interior depends on the size of the resulting clear sliding roof opening and on the volume of the interior of the vehicle.

The excitation of the interior to resonance can be explained as a consequence of the instability of the shear layer. The smallest obstructions in the front region of the sliding roof are already sufficient to excite the shear layer to oscillate. These oscillations are stimulated downstream. The flow, so disturbed, strikes the rear edge of the resulting clear opening of the sliding roof. Periodically alternatively, it is flushed over this edge and pressed into the interior of the vehicle, the latter causing a pressure wave. A portion of this pressure wave moves upstream and, in a fixed phase relationship to the preceding disturbance, leads there to a fisher stimulation of the shear layer. A self-reinforcing shear layer oscillation, with a dominating main frequency, which is shifted to higher frequencies as the speed of the vehicle increases and depends on the opening length of the resulting clear sliding roof opening, arises in this manner. If this excitation frequency is identical with the resonance frequency of the interior and if the amplitude of the oscillations, in what is the rear region in the driving direction, of the resulting clear sliding roof opening, is sufficiently large, then is perceived as a sliding roof buffeting noise.

It is an object of the invention to provide a sliding roof, which can interfere selectively with the aerodynamic excitation mechanism of the buffeting noise. The buffeting noise shall be reduced to a level, which can no longer be perceived subjectively.

This objective is accomplished by the object of claim 1. Advantageous developments of the invention are the objective of further claims.

The inventive device involves a modification of the geometry of the corners of the sliding roofs with an essentially rectangular or trapezoidal, resulting, clear sliding roof opening by the complete or partial covering of at least one of the rear corner regions, as seen in the driving direction, of the resulting clear sliding roof opening. This inventive modification can be realized, for example, in the following way:

By a further development of sliding roofs with essentially rectangular, but also trapezoidal, resulting sliding roof openings, for example, by providing a folding, sliding, turning or stretching mechanism for extending or stretching different embodiments of the inventive covering in the event that the opening lengths of the resulting clear sliding roof opening are critical with respect to buffeting noise or by a corresponding retrofitting of existing sliding roofs with an essentially rectangular or trapezoidal resulting clear sliding roof opening.

New sliding roofs, which are to be developed, alternatively can receive a resulting clear sliding roof opening which, starting out from an essentially rectangular resulting clear sliding roof opening, receives a shape corresponding to the above-mentioned corner covering.

A combination of a partial shape change of an original essentially rectangular resulting clear sliding roof opening and partially of a covering, which can be added on, is also conceivable.

The fluctuations of the shear layer flow and the sliding roof opening, as an exciter of the resonance, increase from the middle of the vehicle to the outside. Since the disturbances in the shear layer, as described above, also increase in the direction of flow, the fluctuations are greatest in the rear outer region of the rectangular or trapezoidal resulting clear sliding roof opening. With the inventive device, the outer fluctuations, which are the main cause of the excitation of the interior, are selectively repressed or disturbed, so that the resonance oscillations can no longer be perceived as a buffeting noise.

The inventive device enables the opening length of the resulting clear sliding roof opening to be enlarged more than previously without having a buffeting noise arise. At higher driving speeds, there are no additional flow noises caused by the device.

After adaptation to the respective physical and geometric factors, the effectiveness of the inventive device can be demonstrated in wind tunnel and driving experiments on any vehicles generating the buffeting noise in their basic configuration. This proof can be furnished by subjective perception as well as by measurement.

The advantages, associated with the invention, can be seen to be therein that the buffeting noise cannot be reduced in such a manner with any other known measures of comparable low expense for comparable opening lengths of the resulting clear sliding roof opening without the generation of additional, extremely undesirable noises. Admittedly, an appreciable lowering in the buffeting noise level is possible with wind deflectors or other flow deflectors mounted in the region of what, in the driving direction, is the front edge of the sliding roof cutout. However, flow noises, that is, wind rushing noises or whistling, generated by these devices, occur at higher speeds. A complete elimination of the buffeting noise can at times not be achieved for certain types of vehicles by means of wind deflectors having dimensions acceptable by customers. A reduction in the buffeting noise by means of an only partially open sliding cover and, with that, a smaller, resulting, clear sliding roof opening at driving speeds, which tend to form buffeting noise, is also not desirable because of the appreciable blocking of vision. For the proposed device, the blocking of vision is reduced to a tolerable extent and the opening length of the resulting clear sliding roof opening even remains unchanged in the middle region. Additional wind rushing noise or whistling at higher speeds has not been noted.

Possible areas of application of the invention, aside from reducing the buffeting noise of sliding roofs, arise for problems of a similar nature with cavities, for which an unstable shear layer causes cavity resonances. For example, it is conceivable that the invention can be used when the interior of a vehicle, due to an open side window at higher speeds, is stimulated to produce a noise, which is similar to a buffeting noise but has a significantly greater amplitude. Resonances of shafts in aircraft (such as landing gear shafts) can also be avoided by installing the device or a similar molding.

In the following, the inventive device is explained in greater detail by means of possible embodiments. The starting point here is an example of a sliding roof with an essentially rectangular, resulting, clear sliding roof opening, the rear corner geometry of which is modified by covering elements, which can be mounted subsequently. Because of the plurality of possible modifications of the corner geometry, only a few examples can be listed. Because of the similarity of the embodiments to be used, examples of the inventive device with add-on coverings of the corner regions that are used for an essentially trapezoidal, resulting, clear sliding roof opening, are not listed separately. The examples of the inventive device with the shape changes used for an original essentially rectangular or trapezoidal, resulting, clear sliding roof opening, bring about a resulting, clear, sliding roof opening, which corresponds to the coverings added on subsequently and are therefore also not listed separately.

Figure 2A:
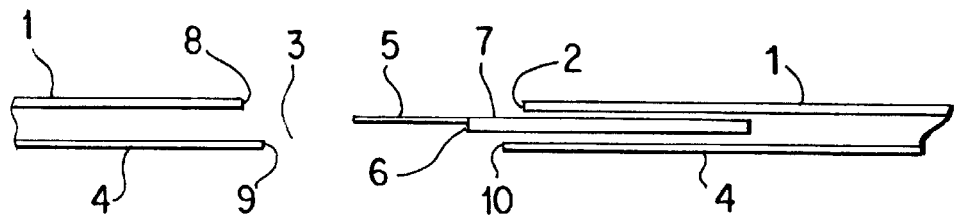
Figure 2B:
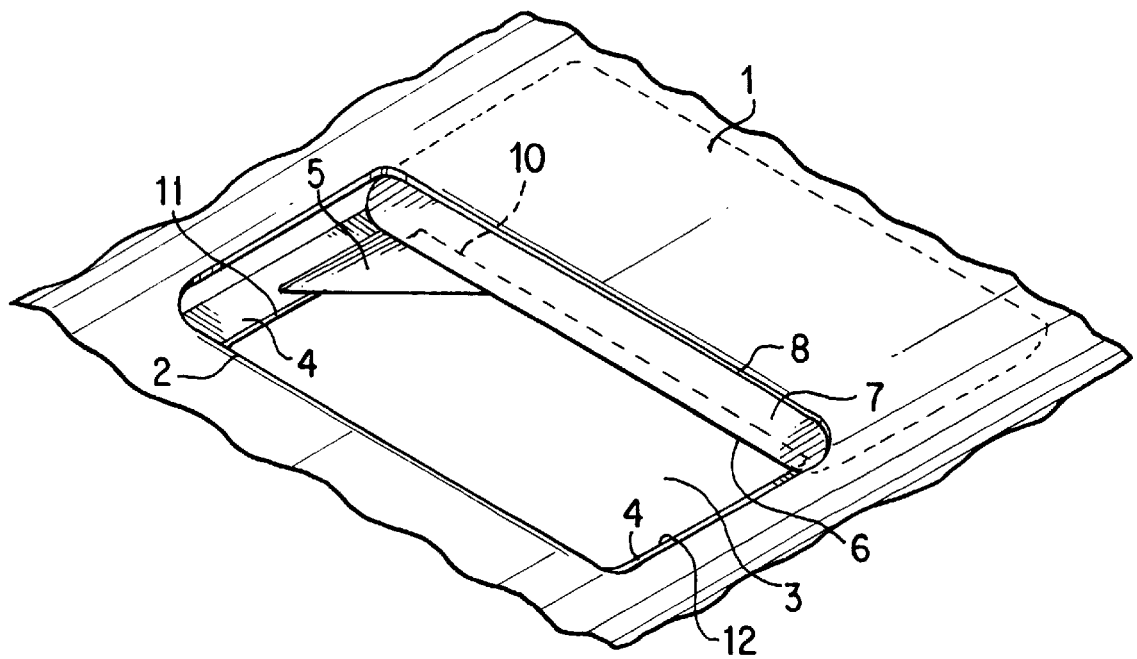
Figure 3A:
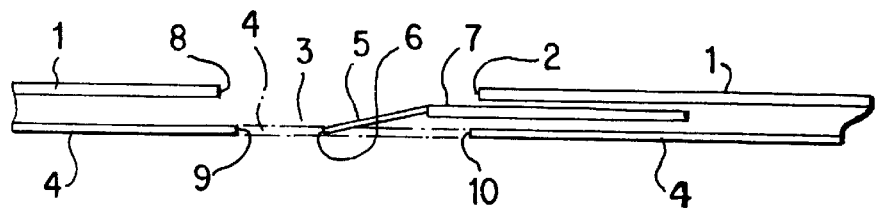
Figure 3B:
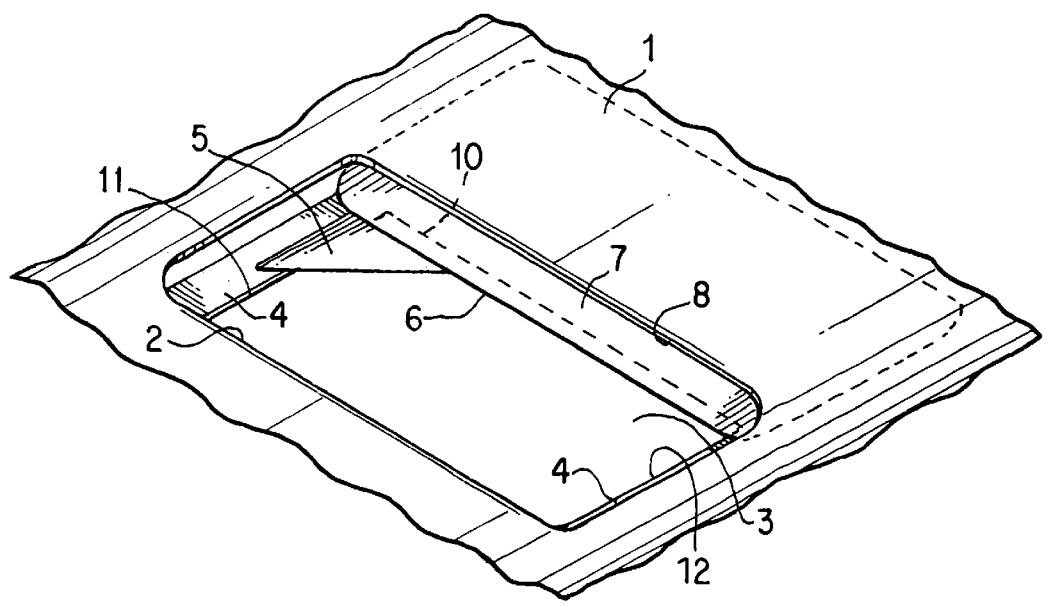
Figure 4:
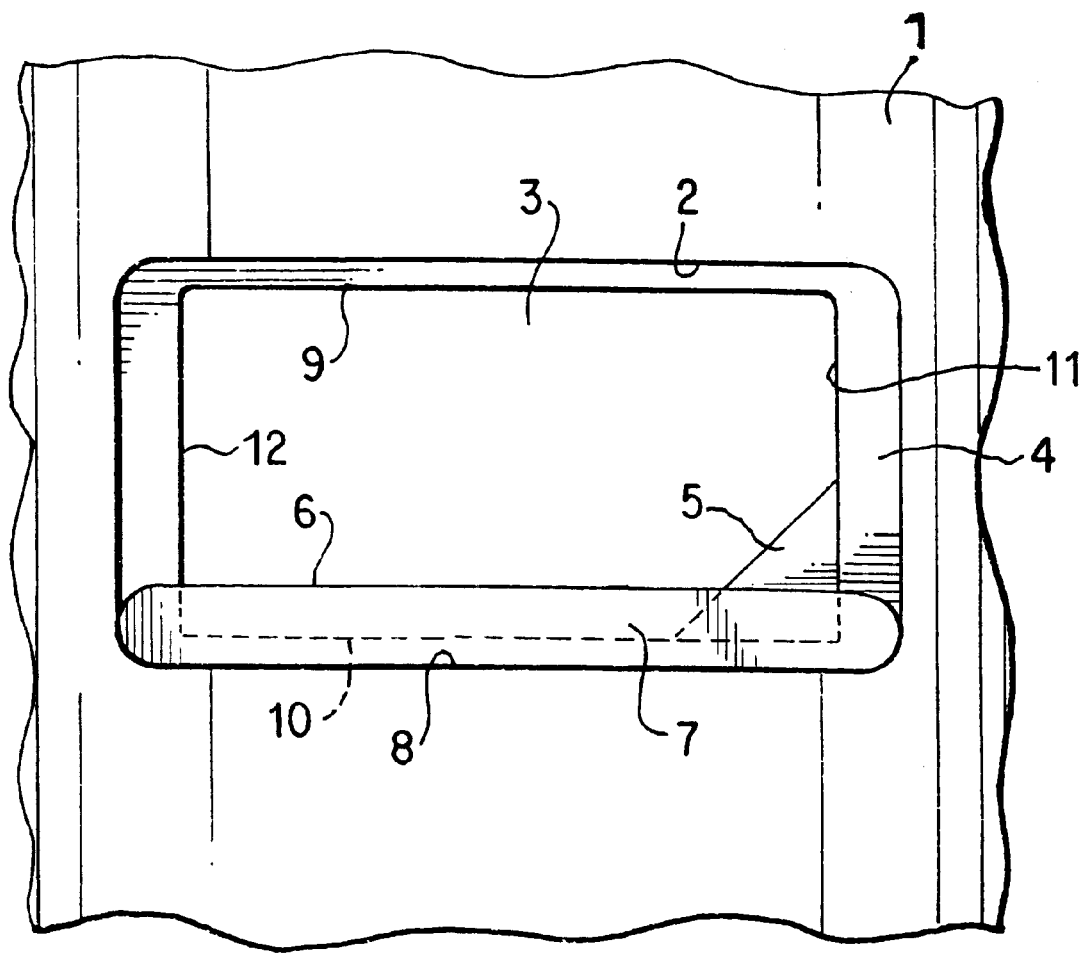
Figure 5A:
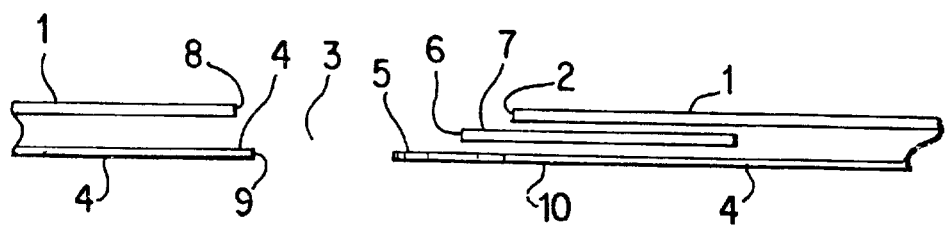
Figure 5B:
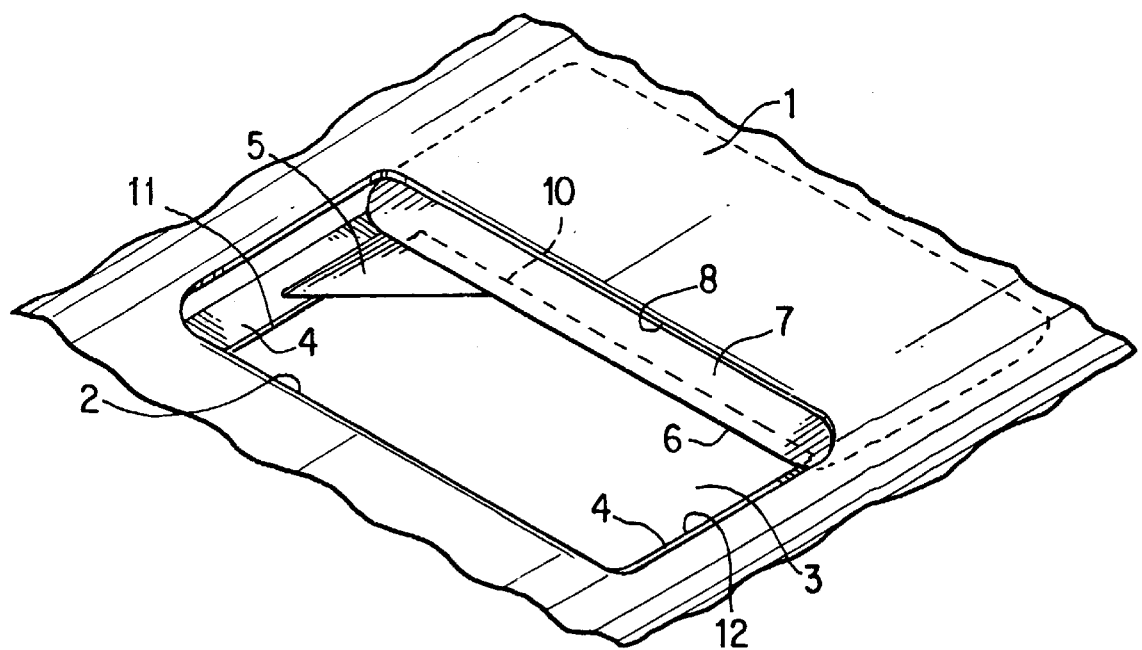
Figure 6A:
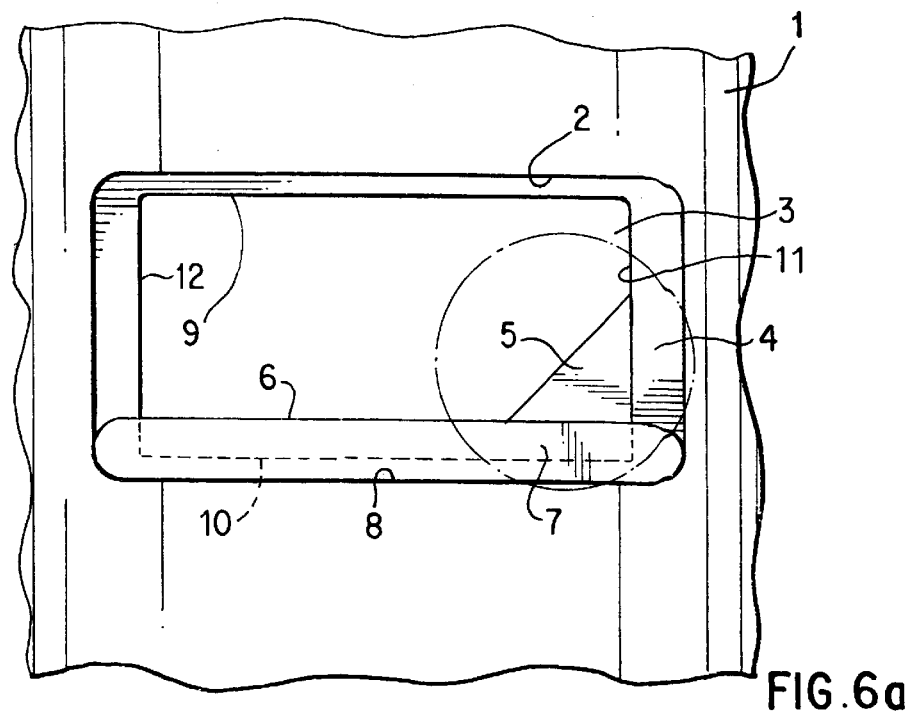
Figure 6B:
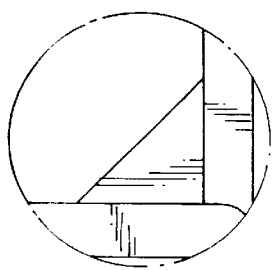
Figure 6C:
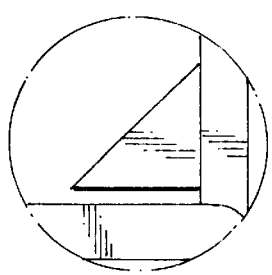
Figure 6D:
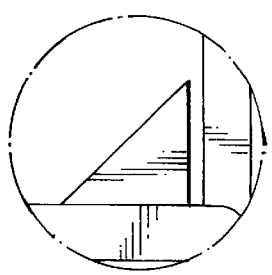
Figure 6E:
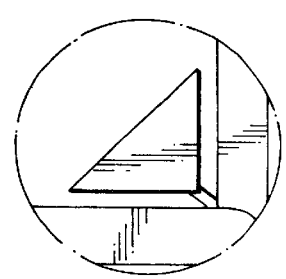
Figure 7A:
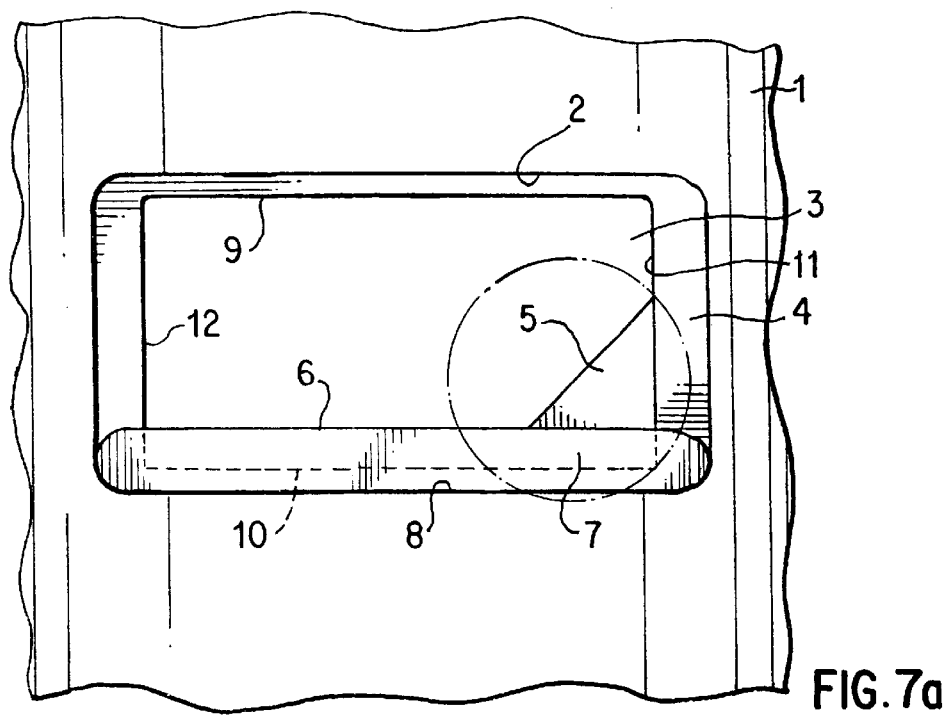
Figure 7B:
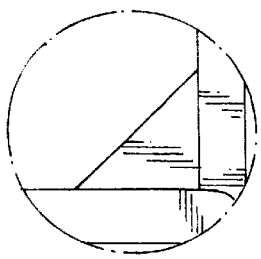
Figure 7C:
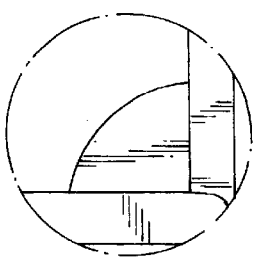
Figure 7D:
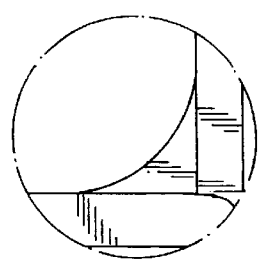
Figure 7E:
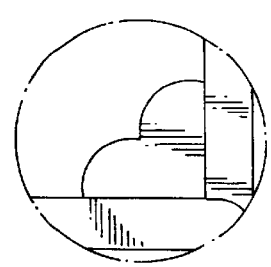
Figure 7F:
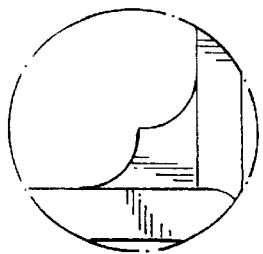
Figure 7G:
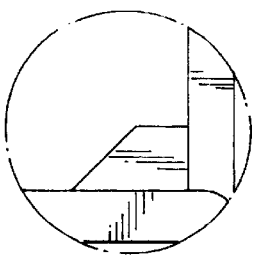
Figure 7H:
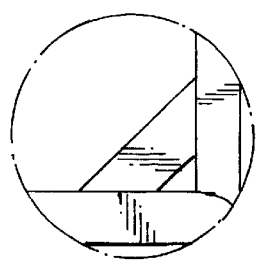
Figure 7I:
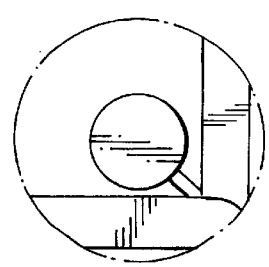
Figure 8A:
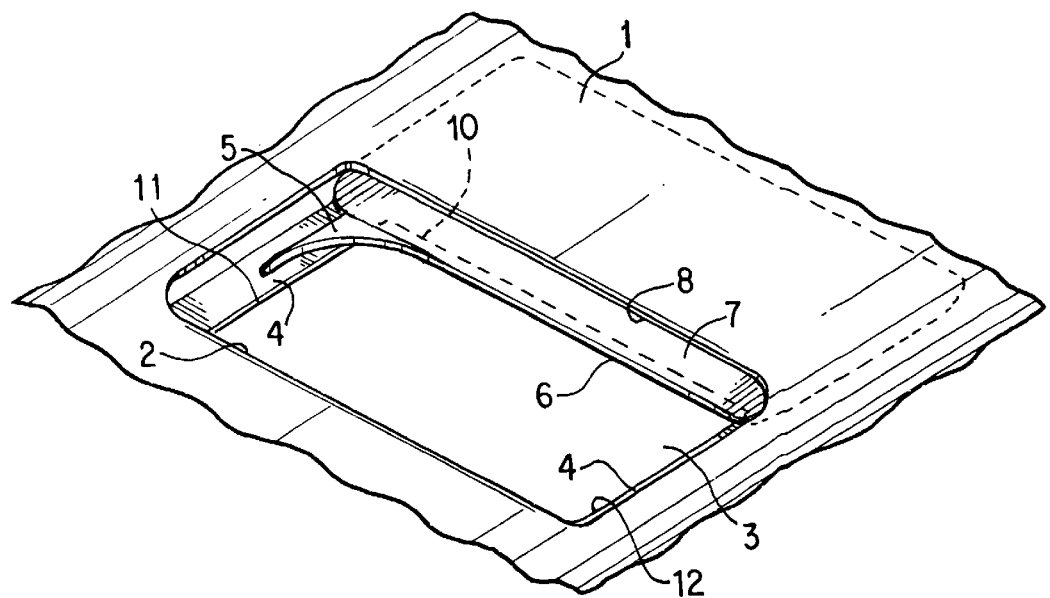
Figure 8B:
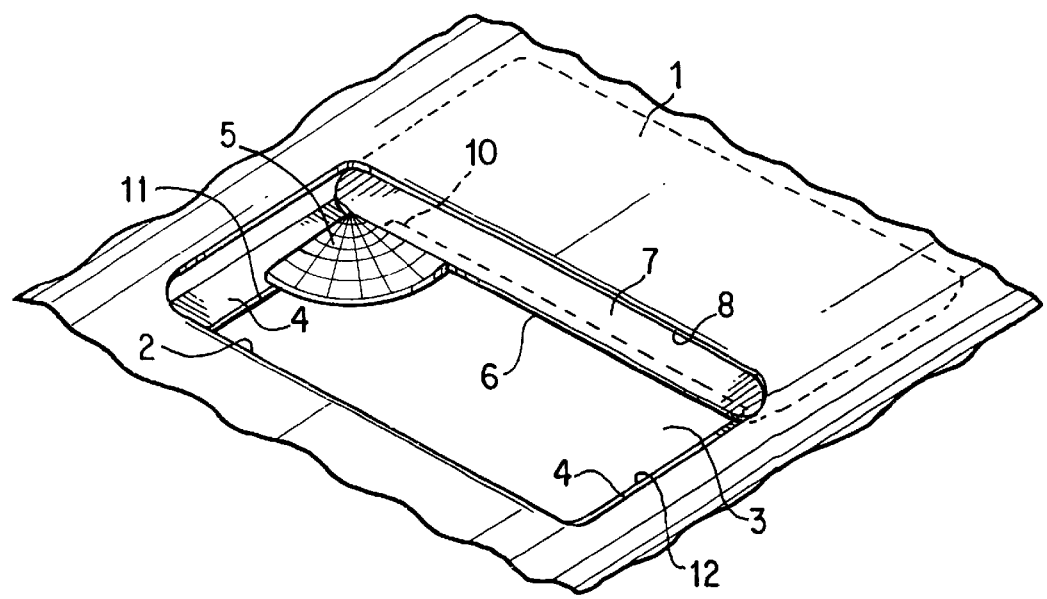
Figure 9A:
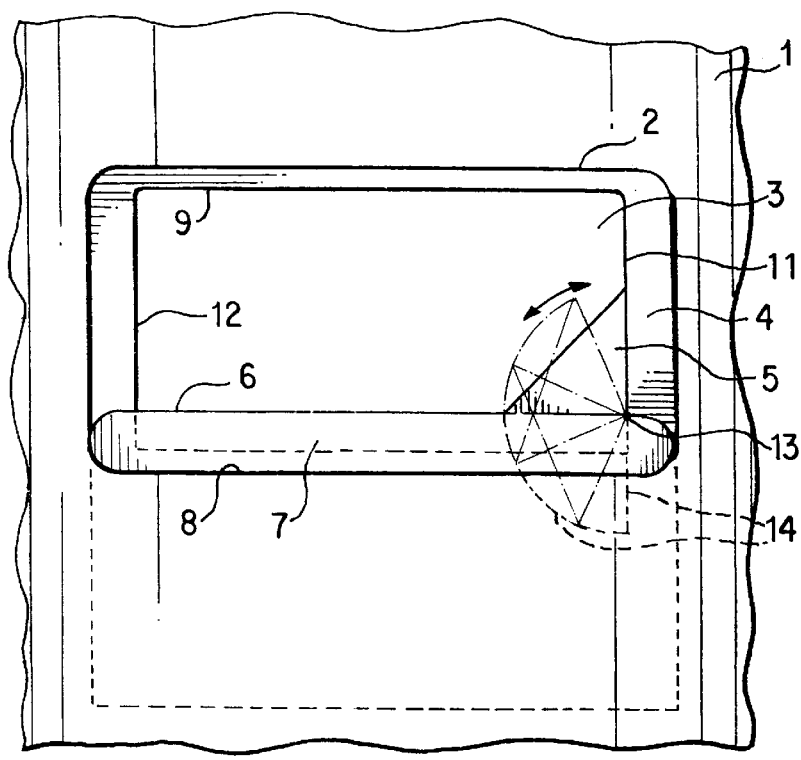
Figure 9B:
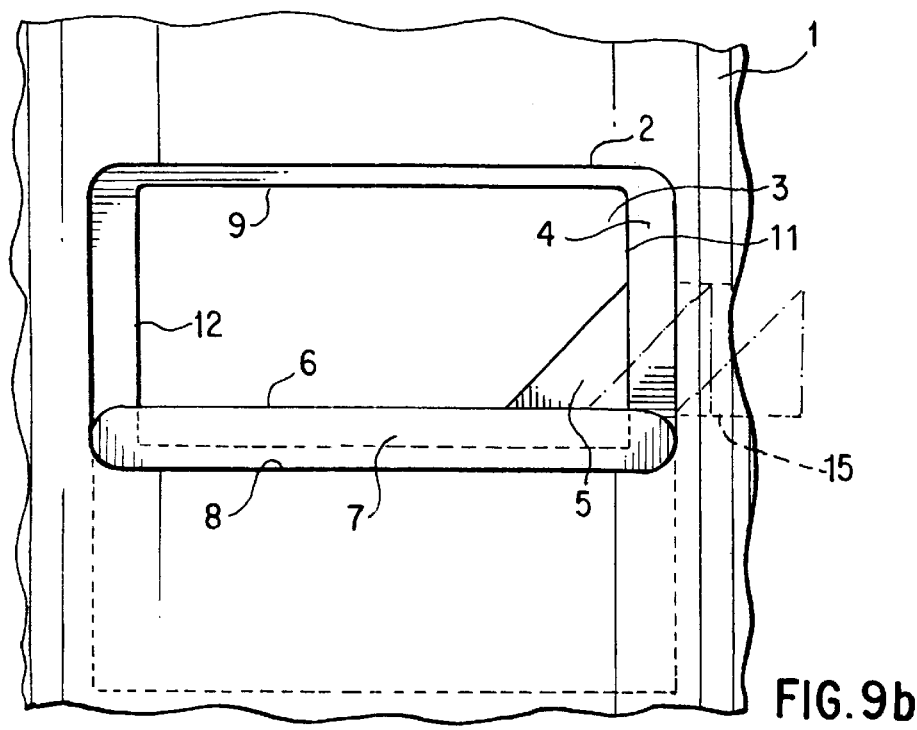
Figure 10A:
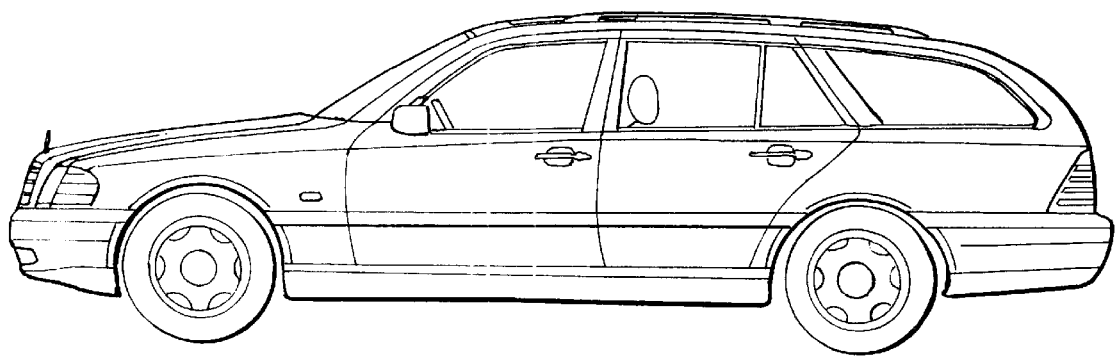
Figure 10B:
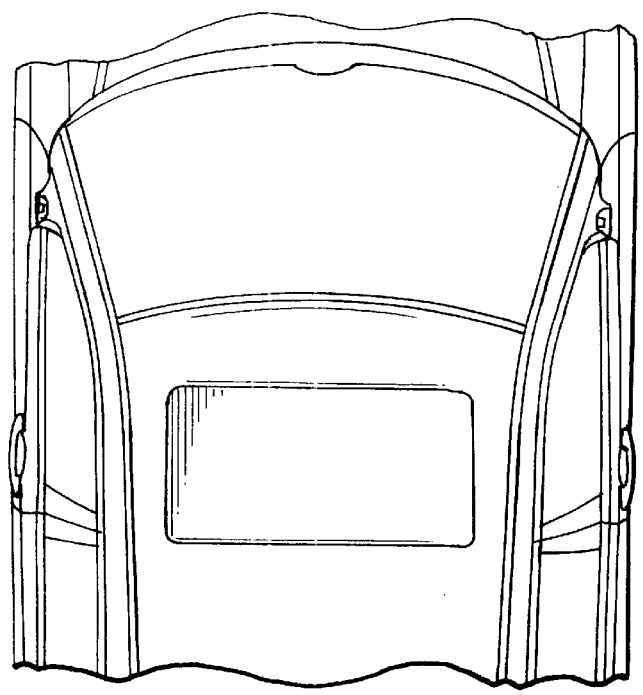
Figure 11:
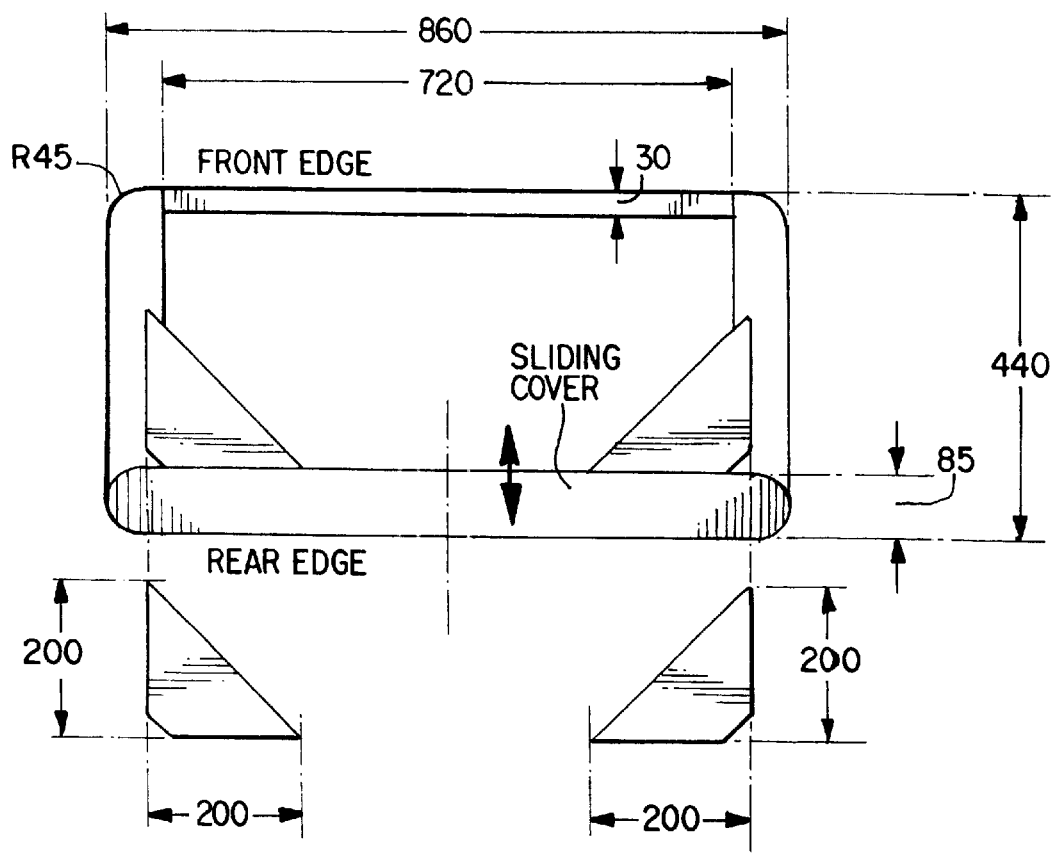

In the drawings,

FIG. 1 shows a plan view of an inventive sliding roof,

FIG. 2 shows a cross-sectional drawing (top) and an oblique view (bottom) of an inventive sliding roof, FIG. 3 shows a cross-sectional drawing (top) and an oblique view (bottom) of an inventive sliding roof, FIG. 4 shows a plan view of an inventive sliding roof, FIG. 5 shows a cross-sectional drawing (top) and an oblique view (bottom) of an inventive sliding roof, FIG. 6 shows a plan view of an inventive sliding roof, as well as several examples of variations for mounting the covering in the horizontal plan of the sliding cover, FIG. 7 shows a plan view of an inventive sliding roof, as well as several examples of geometric variations of the covering, FIG. 8 'a' and FIG. 8 'b' show three-dimensional oblique views of inventive sliding roofs, FIG. 9 'a' and FIG. 9 'b' show two plan views of inventive sliding roofs with different mechanisms for inserting the covering, FIG. 10 shows sketches of a Mercedes-Benz Series S202 vehicle (C class station wagon) in side view and plan view, FIG. 11 shows a technical sketch in plan view of the inventive sliding roof on a Mercedes Benz S202 (C class station wagon).

In FIGS. 1 to 5, advantageous embodiments of the inventive device are shown with regard to the height, at which the covering is disposed.

FIG. 1 shows a plan view of an embodiment of an inventive sliding roof The driving direction (=at the front) corresponds to the upper edge of the picture. The outer sheet metal 1 of the roof of the vehicle, the front edge 2 of the sliding roof cut-out in the sheet metal of the roof, the inner roof 4, which is located below the sheet metal 1 of the roof and forms the upper boundary of the interior of the vehicle, can be recognized. The sliding roof opening with the front edges 9, the rear edge 10, the left edge 11 and the right edge 12 are in the inner roof. Moreover, the rear edge 8 of the sliding roof cutout in the outer sheet metal 1 of the roof and the retracted sliding cover 7, which is located between the outer sheet metal 1 of the roof and the inner roof 4, can be recognized. The construction described so far corresponds to a conventional sliding roof with an essentially rectangular, resulting sliding roof opening. Pursuant to the invention, a covering 5 is disposed in addition in the rear right region of the resulting, clear, sliding roof opening. Without the modification 5, the resulting, clear, sliding roof opening 3, like the sliding roof opening in the inner roof 4, is bounded at the front and at the sides by the edges 9, 11 and 12. Towards the rear, the resulting, clear, sliding roof opening 3, depending on the actual position of the sliding cover 10, is bounded either by the front edge 6 of the latter when this edge 6, in the driving direction, is ahead of the edge 7, which is indicated by a broken line or, if the edge 10, in the driving direction, is ahead of the edge 6 of the sliding cover 7, by the edge 10 and thus corresponds to the sliding roof opening in the inner roof 4. The sliding cover 7 is mounted movably and can be moved forwards for closing the roof completely. The opening length of the resulting clear sliding roof opening 3, that is, the distance between the edge 9 and the edge 6 of the sliding cover 7 or of the edge 10 is of critical importance for the buffeting noise. The embodiment of the inventive covering 5, shown by way of example in FIG. 1, is partly or completely level with the sliding cover 7 in such a manner, that there is partial covering in the rear corner region of the essentially rectangular, resulting clear sliding roof opening 3. For comparison, an unmodified cutout of a sliding roof is always shown in what is the left half of the roof in the driving direction. The rear outer corner regions can be modified on one side, as well as on both sides.

Possible positioning variations of the inventive covering 5 are shown in the cross-sectional drawings of FIGS. 2 'a' and 3 'a' and oblique views in FIGS. 2 'b' and 3 'b'. The direction, in which the vehicle is traveling (front), is oriented in the direction of the left edge of the picture in the case of the cross-sectional drawings of FIGS. 2 'a' and 3 'a' and in the direction of the left lower picture corner in the case of the oblique views of FIGS. 2 'b' and 3 'b'. In FIGS. 2 'a' and 3 'a', the sheet metal 1 of the roof, the front edge 2 and the rear edge 8 of the sheet metal cutout, as well as the inner roof 4, the sliding roof opening with the front edge 9 and the rear edge 10, an advantageous flat embodiment of the inventive covering 5, the sliding cover 7 and its front edge 6 can be recognized. In the two oblique views of FIGS. 2 'b' and 3 'b', as in FIG. 1, the resulting clear sliding roof opening 3 with the outer edges 9, 11, 12 and the, in this example, rear edge 6 can be seen. FIG. 2 shows a flat embodiment of the invention, for which the modification of the geometry of the corners of the resulting clear sliding roof opening 3 is brought about by means of the covering 5 completely at the level of the sliding cover 7. FIG. 3 represents a different advantageous embodiment, for which the modification of the geometry of the corners of the resulting clear sliding roof opening 3 is brought about by means of the covering 5 towards the rear at the level of the sliding cover 7, to the front, however, extends down to the level of the inner roof 4.

In FIGS. 4, 5 'a' and 5 'b', a further example of the inventive device is sketched. The plan view of FIG. 4 corresponds, with regard to perspective and the reference symbols, to FIG. 1. The inventive covering 5, with which the modification of the corner geometry of the resulting clear sliding roof opening 3 is reached, is disposed here at the level of the inner roof 4. The advantageous embodiment of the inventive covering shown is located partially behind the sliding cover edge 6 and is therefore covered party by the sliding cover 7. This is made particularly clear in FIGS. 5 'a' and 5 'b'. The flat embodiment of the modification 5 is clearly below the sliding cover 7 at the level of the inner roof 4 and covers a portion of the rear corners of the resulting clear sliding roof opening 3.

Aside from the different vertical (perpendicularly to the sheet metal of the roof) placings of the inventive covering, as shown, for example, in FIGS. 1 to 5, different horizontal (parallel to the sheet metal of the roof or inner roof) positions, for modifying the geometry of the rear corner regions of the resulting clear sliding roof opening 3 can also be used advantageously. In the plan views of FIGS. 6 'a' to 6 'd', some of those advantageous positions are shown.

FIG. 6 'a' shows an example, which terminates at the level of the sliding cover 7 flush with the front edge 6 of the sliding cover 7. Towards the side, the embodiment of the inventive covering 5 shown, in the projection onto the inner roof 4, lies in contact with the edge 11 of the inner roof 4, but does not necessarily have to be connected tightly with the two edges 6 and/or 11. For the embodiment shown in FIG. 6 'b', the covering 5, in the projection on the inner roof 4, admittedly is in contact with the edge 11; in the rear region, however, it is at a horizontal distance from the front edge 6 of the sliding cover 7. The embodiment of FIG. 6 'c', on the other hand, is flush with the front edge 6 of the sliding cover 7; in the projection on the inner roof 4, however, it is not in direct contact with the edge 11 of the sliding cover 7. In FIG. 6 'd', the advantageous embodiment shown is not in contact either with edge 6 or with edge 11.

Beyond the examples shown, further vertical (perpendicular to the sheet metal of the roof) and horizontal (parallel to the sheet metal of the roof or of the inner roof) positions within the sliding roof cutout for modifying the geometry of the rear corners of the resulting clear sliding roof opening 3 are possible. Aside from the positions shown in FIGS. 1 to 5, the inventive covering can also, for example, be disposed between the sliding cover 7 and the inner roof 4 or also above the sliding cover 7. Depending on the vertical position of the covering, further horizontal orientations, other than those described in FIG. 6, are also conceivable in the corner regions. The modification can be inclined downward, as in FIG. 3, and also upward. The inclination and position of the modification are to be selected so that the projection in the plane parallel to the sheet metal 1 of the roof or to the sliding cover 7 results in a sufficiently large obstruction area in the region of the rear corners of the resulting clear sliding roof opening 3.

All basic geometric shapes come into consideration in the plane parallel to the sheet metal of the roof for the inventive covering for modifying the corner geometry in the rear region of the essentially rectangular or trapezoidal resulting clear sliding roof opening 3 of a conventional sliding roof. These are, for example, triangular, rectangular, trapezoidal or rounded shapes, such as circles, or concave or convex arcs, as well as sectional combinations of segments of these shapes. Some examples of such geometric shapes can be seen in the plan view of FIG. 7. For example, the inventive covering 5 is positioned level with and flush with the sliding cover 7 and, in the projection onto the inner roof 4, in contact with the right edge 11 of the inner roof 4.

FIG. 7 'a' shows a basic triangular shape of the inventive covering 5. In FIG. 7 'b', this basic triangular shape was combined with a convex arc segment FIG. 7 'c' shows a combination of the basic triangular shape with a concave arc segment. In FIG. 7 'd', such a combination is shown with sectionally convex arc segments. In FIG. 7 'e', the basic triangular shape is combined with concave elements. FIGS. 7 'f' and 7 'g' show two examples of trapezoidal corner modifications, while in FIG. 7 'h', a circular area covers portion of the rear corner of the resulting clear sliding roof opening 3.

Aside from the described, different, geometric shapes of the inventive covering in the plan view of the sliding roof, other curvatures, protuberances or other deviations from the flat, two-dimensional geometry are also conceivable.

In FIGS. 8 'a' and 8 'b', two examples of "three-dimensional" versions are sketched level with the sliding cover 7. Both versions show a basic triangular shape in the plan view onto the sliding roof. In FIG. 8 'a', this basic shape curves upward, whereas FIG. 8 'b' has a downwards curvature. The property, that the resulting clear sliding roof opening 3 is adequately covered in the region of the rear ends, is a common feature of all versions.

The materials, used to modify or appropriately shape the corners, are designed so that the flow in the rear outer corner region of the resulting clear sliding roof opening 3 can be perturbed sufficiently strongly. This can be accomplished with rigid materials, such as sheet steel, wood and plastic, which are impermeable to flow, as well as with elastic materials, such as cloth, film, sheet, etc., which are partly or completely permeable to flow and stretched in the rear outer corner region of the resulting clear sliding roof opening 3 with an appropriate device.

In one example (FIG. 9 'a') of the technical conversion of a conventional essentially rectangular sliding roof, the inventive covering 5 is stowed away in a recess 14 in the sliding cover 7. The covering 5 shown has a triangular, flat basic shape and is level with the sliding cover 7. The triangle 5 is connected at one corner over a pivot 13 with a front edge of the sliding cover 6. The sliding cover 7 has a sandwich-like construction, so that the flat triangle 5 can be rotated about the pivot 13 into the lid, as sketched in FIG. 9 'a', Upon retracting the sliding cover, when the resulting clear sliding roof opening 3 reaches a length critical for the buffeting noise, the inventive covering can be rotated, for example, with a spring mechanism into the region of the rear corners of the resulting clear sliding roof opening 3.

In a further example (FIG. 9 'b'), the inventive covering 5, constructed as a flat triangle, is stowed into a recess 15 in the outer edge of the sliding roof cutout, between the inner roof 4 and the outer sheet metal I of the roof, for example, level with the sliding cover 7. Upon retracting the sliding cover 7, the inventive covering is pushed from the outside into the region of the rear corners of the resulting clear sliding roof opening 3 when the length of the resulting clear sliding roof opening 3 reaches a critical value with respect to the buffeting noise.

The advantage of the variation shown in FIG. 9 lies therein that, for opening lengths which are not critical with respect to buffeting noise, there is no unnecessary, additional blockage of vision.

In a concrete application example, an advantageous embodiment of the invention for reducing the buffeting noise is used with a Mercedes-Benz S202 (station wagon of the C class) which, in the basic configuration (without wind deflectors), generates appreciable buffeting noise when the sliding roof is open completely. In order to gain a better picture of the position of the inventive device in the vehicle, this device is shown in side view in FIG. 10 '*a*', The vehicle is being driven in the direction of the left edge of the picture. FIG. 10 '*b*' shows a section of the vehicle in plan view from above. The driving direction is oriented here in the direction of the upper edge of the picture. As is evident from FIG. 10 '*b*', the sliding roof is located symmetrically to the driving direction in the center of the sheet metal of the roof a short distance behind the windshield.

In FIG. 11, a plan view of the sliding roof of the S202 is shown with the sliding cover retracted completely with a particularly effective example of the inventive covering. The driving direction is in the direction of the upper edge of the picture. The resulting clear sliding roof opening is changed here, in that two flat triangular, thin boards of a rigid material, such as wood or sheet metal, are mounted in the rear corners level and flush with the sliding cover and also flush with the inner roof. FIG. 11 shows that the two thin boards, in the shape of an equilateral right angle, have a leg length of 200 mm and a thickness of 5 mm. As is evident from FIG. 11, the cutout in the sheet metal of the roof is 440 mm by 860 mm for the Mercedes-Benz S202. In the present example, the thin boards, because they can be fastened more easily to the edge of the inner roof, are mounted so that they are inclined from the sliding cover by a few degrees downwards towards the front. The flush connection of the thin boards with the edge of the inner roof and the sliding cover, employed here, is brought about with aluminum tape (Scotch Pressure Sensitive Tape). The buffeting noise of the S202 can be reduced in this manner to such an extent, that it can no longer be detected subjectively. This state of affairs, established by measurement in the wind tunnel, is confirmed subjectively by first driving experiments with the vehicle of type S202 (C class station wagon).

List of Reference Symbols 1. outer sheet metal roof of the vehicle
2. front edge of the sliding roof cutout
3. resulting clear sliding roof opening
4. inner roof
5. inventive covering
6. front edge of the sliding cover 7
7. sliding cover
8. rear edge of the sliding roof cutout
9. front edge of the sliding roof opening in the inner roof 4
10. rear edge of the sliding roof opening in the inner roof 4
11. right edge of the sliding roof opening in the inner roof 4
12. left edge of the sliding roof opening in the inner roof 4
13. pivot
14. recess in the sliding cover 7
15. recess in the edge of the sliding roof cutout

What is claimed is:

1. A sliding roof for a motor vehicle which reduces sliding roof buffeting noise, comprising a sliding roof opening and a movable sliding cover for covering the sliding roof opening, whereby, depending on a position of the sliding cover, a resulting clear sliding roof opening is formed, wherein the geometry of the resulting clear sliding roof opening is modified by a partial or complete covering of at least one of the, as seen in the driving direction, rear corner regions of the resulting clear sliding roof opening, wherein the geometry of a rear center region and a side center region of the resulting clear sliding roof opening remain unmodified.

2. The sliding roof of claim 1, wherein the covering comprises at least one insertable element separate from said sliding cover.

3. The sliding roof of claim 1, wherein the covering comprises a shaped portion of the sliding cover.

4. The sliding roof of claim 1, wherein the covering comprises at least one basic geometric shape selected form the group consisting of: triangular, rectangular, trapezoidal, rounded, circular, convex, and concave.

5. The sliding roof of claim 1, wherein the covering is flat.

6. The sliding roof of claim 1, wherein the covering and a front region of the sliding cover partially overlap.

7. The sliding roof of claim 1, wherein the covering has at least one of curvatures, protuberances or other deviations from a plane geometry.

8. The sliding roof of claim 1, wherein the covering is disposed at one of level with the sliding cover and at a vertical position between the sliding cover and an inner roof.

9. The sliding roof of claim 1, wherein the covering is disposed flush with the rear edge of the resulting clear sliding roof opening.

10. The sliding roof of claim 1, wherein the covering, lies in contact with an inner roof of the vehicle.

11. The sliding roof of claim 1, wherein the covering is disposed flush with a side edge of the resulting clear sliding roof opening.

12. The sliding roof of claim 1, wherein the covering, lies in contact with a side edge of an inner roof of the vehicle.

13. The sliding roof of claim 1, wherein the covering consists of at least one of a rigid material which is impermeable to flow, and an elastic material which is at least partially permeable to flow.

* * * * *